(12) United States Patent
Fujita et al.

(10) Patent No.: US 6,632,900 B2
(45) Date of Patent: Oct. 14, 2003

(54) OLEFIN POLYMER, OLEFIN POLYMERIZATION CATALYST AND PROCESS FOR PRODUCING OLEFIN POLYMER

(75) Inventors: Masayuki Fujita, Ichihara (JP); Tatsuya Miyatake, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 72 days.

(21) Appl. No.: 09/922,708

(22) Filed: Aug. 7, 2001

(65) Prior Publication Data

US 2002/0002254 A1 Jan. 3, 2002

Related U.S. Application Data

(62) Division of application No. 09/228,553, filed on Jan. 12, 1999, now Pat. No. 6,288,192.

(30) Foreign Application Priority Data

Jan. 14, 1998 (JP) .......................................... 10-005529

(51) Int. Cl.[7] .................................................. C08F 4/42
(52) U.S. Cl. ........................ 526/161; 526/111; 526/80; 526/154; 526/158; 526/348; 526/142; 502/111
(58) Field of Search .................. 526/111, 80, 154, 526/158, 348, 348.6, 161, 142; 502/111

(56) References Cited

U.S. PATENT DOCUMENTS

5,321,107 A * 6/1994 Tsutsui et al. ............... 526/138
5,965,758 A 10/1999 Nabika et al.

FOREIGN PATENT DOCUMENTS

| EP | 0604908 A2 | 7/1994 |
| EP | 0604917 A2 | 7/1994 |
| WO | WO9500562 A1 | 5/1995 |

OTHER PUBLICATIONS

Miyatake et al. Makromol. Chem., Rapid Commun. 10, 349–352 (1989).*
Miyatake et al., Makromol. Chem., Rapid Commun., vol. 10, pp. 349–352 (1989).
Fries et al., Chem. Commun., pp. 783–784 (1996).
O. Henschke, J.M.S.–Pure Appl. Chem., A35 (3), pp. 473–481 (1998).

* cited by examiner

Primary Examiner—Ling-Siu Choi
(74) Attorney, Agent, or Firm—Birch, Stewart, Kolasch & Birch, LLP

(57) ABSTRACT

An olefin polymerization catalyst obtained by contacting a specific transition metal compound(A), an organoaluminumoxy compound (B) soluble in an aromatic solvent and water (C), and a process for producing an olefin polymer with said catalyst.

10 Claims, 1 Drawing Sheet

OLEFIN POLYMER, OLEFIN POLYMERIZATION CATALYST AND PROCESS FOR PRODUCING OLEFIN POLYMER

This application is a divisional of application Ser. No. 09/228,553, filed on Jan. 12, 1999, now U.S. Pat. No. 6,288,192, the entire contents of which are hereby incorporated by reference and for which priority is claimed under 35 U.S.C. §120; and this application claims priority of Application No. 10-005529 filed in Japan on Jan. 14, 1993 under 35 U.S.C. §119.

BACKGROUND OF THE INVENTION

1. Field of the Invention

The present invention relates to an amorphous polymer and a process for production thereof, and a catalyst for polymerizing an olefin. More specifically, the present invention relates to an amorphous polymer having a high molecular weight enough to improve problems such as stickiness, elution to an organic solvent and the like, and to exhibit an elastomeric property and substantially not having a melting point, an olefin polymerization catalyst suitable for producing said amorphous polymer and a process for producing said amorphous polymer.

2. Description of Related Arts

An amorphous poly($\alpha$-olefin)(for example, an atactic polypropylene and an atactic poly(1-butene)) has been mainly used as a sticking agent, an improving agent for a crystalline polyolefin and the like. However, the molecular weight of an amorphous poly($\alpha$-olefin), as known well, is not high enough, therefore the amorphous poly($\alpha$-olefin) has problems such as stickiness of a product, elution to an organic solvent and the like, and it is difficult to say that an elastomeric property is sufficiently exhibited.

With respect to a synthesis of the amorphous polymer, Some processes have been known. It has been known from old times that a low-crystalline polymer prepared as a by-product is recovered when an olefin is polymerized with a solid Ziegler-Natta catalyst and an isotactic polymer is produced. However, the polymer obtained then has a low molecular weight and wide molecular weight distribution, and there have been problems such as stickiness of a product, elution to an organic solvent and the like.

Further, there are a report (Chem. Commun., 1996, 783) in which a high molecular weight poly(1-hexene) can be synthesized by polymerizing 1-hexene under a ultra-high pressure of 250 Mpa with a catalyst composed of using a hafnocene dichloride compound and methyl aluminoxane, and a report (EP0604917 A2 and EP0604908 A2) in which a polypropylene having a weight average molecular weight Mw of 377,000, a molecular weight distribution Mw/Mn (number average molecular weight) of 2.64 and a viscosity [$\eta$] of 2.28 dl/g, and a poly(1-butene) having a viscosity [$\eta$] of 1.29 dl/g, can be synthesized by polymerizing propylene with a catalyst composed of dimethylsilylene bis(9-fluorenyl) zirconium dichloride and methyl alumoxane, but a polymer having an adequate high molecular weight and narrow molecular weight distribution is not obtained.

On the other hand, a polymer having a Mw of more than $8 \times 10^6$ can be synthesized (Macromolecular Chemie, Rapid Communication, Vol. 10 (1989), page 349) by polymerizing propylene using a transition metal compound having an aryloxy ligand as a catalyst component, but the glass transition temperature of the polymer was somewhat high and an elastomeric property was not sufficient. Further, in the polymerization of an olefin having 4 or more carbon atoms with such catalyst, the resulted polymer was also not always satisfactory in the points of stickiness and elution property to an organic solvent.

As described above, a poly($\alpha$-olefin of 4 or more carbon atoms) which has an adequate high molecular weight and narrow molecular weight distribution and no melting point substantially, and is amorphous, is not obtained.

SUMMARY OF THE INVENTION

An object of the present invention is to provide an amorphous polymer having a high molecular weight enough to improve problems such as stickiness, elution to an organic solvent and the like, and to exhibit an elastomeric property, and substantially not having a melting point.

Another object of the present invention is to provide an olefin polymerization catalyst suitable for producing said amorphous polymer.

Still another object of the present invention is to provide a process for producing said amorphous polymer.

Other objects and advantages of the present invention will be apparent from description below.

The present inventors have intensively studied to attain the above-mentioned objects, and as a result, completed the present invention.

According to the present invention, there are provided an olefin polymer selected from the group consisting of a 1-butene homopolymer, a copolymers of 1-butene with propylene or an alkenyl hydrocarbon having 5 or more carbon atoms, wherein said olefin polymer is an amorphous polymer having a polystyrene-reduced number average molecular weight of 200,000 and substantially not having a melting point, an olefin polymerization catalyst obtained by contacting:

a transition metal compound(A) represented by the general formula (1) described below;

an organoaluminumoxy compound (B) soluble in an aromatic solvent; and water (C), wherein the molar ratio of aluminum atom contained in the organoaluminumoxy compound (B) to a transition metal atom contained in the transition metal compound (A) is 1 to 20000, and the amount of water used is 0.1 to 3.0 mol per 1 mol of aluminum atom contained in the organoaluminumoxy compound (B).

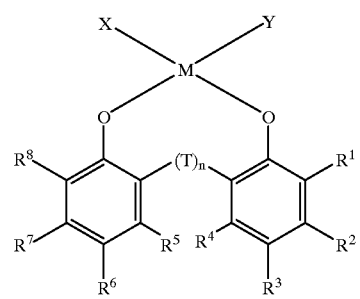

(1)

(wherein M represents a transition metal atom of the Fourth Group of the Periodic Table, X and Y independently represent a hydrogen atom, a halogen atom, an alkyl group, an aryl group, an aralkyl group, an alkoxy group, an aryloxy group, an aralkyloxy group, a sulfonyloxy group, a di-substituted amino group or a substituted silyl group. $R^1$, $R^2$, $R^3$, $R^4$, $R^5$, $R^6$, $R^7$ and $R^8$ independently represent a hydrogen atom, an alkyl group, an aryl group, an aralkyl group, an alkoxy group, an aryloxy group, an aralkyloxy group, a di-substituted amino group or a substituted silyl group. Further, $R^1$, $R^2$, $R^3$ $R^4$, $R^5$, $R^6$, $R^7$ and $R^8$ may be optionally bonded to form a ring. T represents a divalent covalent crosslinking group having 1 to 20 carbon atoms, or a divalent group represented by —O—, —S—, —S—S—, —S(=O)—, —S(=O)$_2$—, —C(=O)—, —N(R$^9$)—, —P(R$^9$)—, or —P(=O)(R$^9$)— (wherein R$^9$ represents a hydrogen atom or a hydrocarbon group having 1 to 6 carbon atoms in each case), n is an integer of from 0 to 3.), and a process for producing an olefin polymer which comprises polymerizing 1-butene, or 1-butene with propylene or an alkenyl hydrocarbon having 5 or more carbon atoms with said olefin polymerization catalyst.

DETAILED DESCRIPTION OF THE INVENTION

Figure 1:
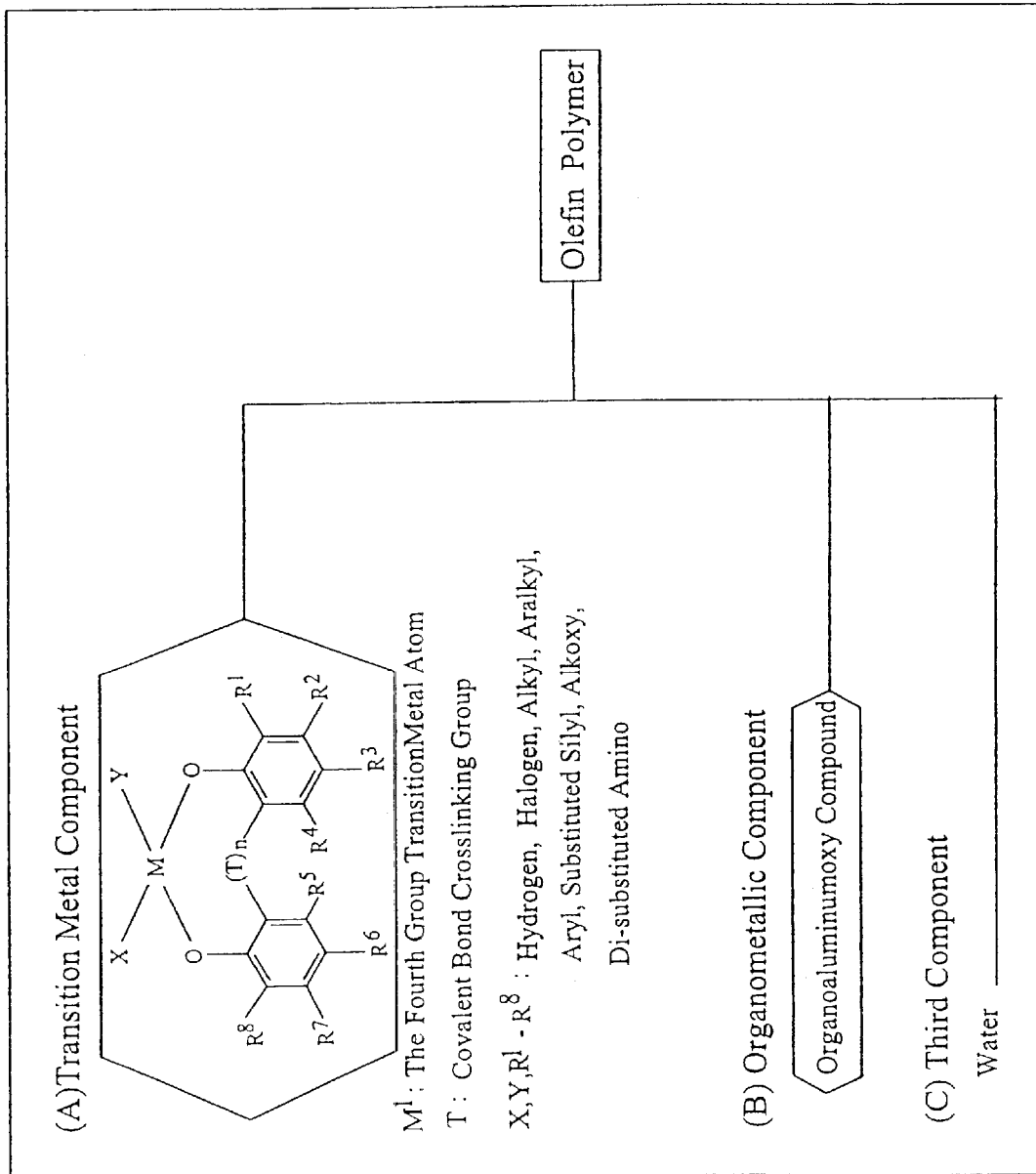
FIG. 1 is a flow chart to aid the understanding of the present invention. The flow chart is a representative example of the mode of operation of the present invention, and the present invention is not limited thereto.

The present invention is explained in detail below.

The olefin polymer of the present invention is a 1-butene homopolymer or a copolymer of 1-butene with propylene or an alkenyl hydrocarbon having 5 or more carbon atoms and an amorphous polymer having a polystyrene-reduced number average molecular weight (hereinafter, sometimes referred to as "Mn") of 200,000, and substantially not having melting point.

The Mn of the olefin polymer of the present invention is 200,000 or more, preferably 300,000 or more, and more preferably 500,000 or more. When the Mn of the olefin polymer is less than 200,000, it is not preferable because problems such as stickiness and elution to an organic solvent sometimes happen to occur.

Herein, the Mn described above and Mw described below mean a polystyrene-reduced number average molecular weight and a polystyrene-reduced weight average molecular weight, respectively, measured by gel permeation chromatography method.

The olefin polymer of the present invention is an amorphous polymer substantially not having a melting point. The melting point is usually measured with a differential scanning calorimeter (DSC) or the like. In the present invention, the term "substantially not having a melting point" means that a crystal melting peak or crystallization peak is not substantially observed in the DSC measurement.

Among the 1-butene copolymers in the present invention, the copolymer of 1-butene with an alkenyl hydrocarbon having 5 or more carbon atoms is preferable.

Examples of the alkenyl hydrocarbon having 5 or more carbon atoms include α-olefins having 5 or more carbon atoms, preferably 5 to 20 such as 1-pentene, 1-hexene, 3-methyl-1-pentene, 3-ethyl-1-pentene, 4-methyl-1-pentene, 1-octene, 1-decene, 1-dodecene, 1-tetradecene and the like, and vinylcyclohexane and the like. As the alkenyl hydrocarbon having 5 or more carbon atoms, a straight or branched chain α-olefin is preferable and 1-hexene, 1-octene or 4-methyl-1-pentene is more preferable.

As the copolymer of 1-butene with propylene or an alkenyl hydrocarbon having 5 or more carbon atoms in the olefin polymer of the present invention, the molar ratio of copolymerization of 1-butene to propylene or an alkenyl hydrocarbon having 5 or more carbon atoms can be usually in a wide range of 1 to 99:99 to 1, preferably 10 to 99:90 to 1, more preferably 20 to 99:80 to 1, even more preferably 50 to 99:50 to 1, and most preferably 70 to 99:30 to 1.

As the olefin polymer of the present invention, a 1-butene homopolymer having a molecular weight distribution (hereinafter, sometimes referred to as "Mw/Mn") represented by the ratio of Mw to Mn is preferably 3.0 or less, and more preferably 2.5 or less.

Such olefin polymer can be produced using, for example, said olefin polymerization catalyst obtained by contacting a transition metal compound (A) represented by the general formula (1) described above, an organoaluminumoxy compound (B) soluble in an aromatic solvent, and water (C).

In the fore-mentioned general formula (1), M represents a transition metal atom of the Fourth Group of the Periodic Table (IUPAC Inorganic Chemistry Nomenclature, a revised edition, 1989) of elements, and a titanium atom, a zirconium atom or a hafnium atom is preferable and a titanium atom is more preferable.

In the general formula (1), respective X and Y independently represent a hydrogen atom, a halogen atom, an alkyl group, an aryl group, an aralkyl group, an alkoxy group, an aryloxy group, an aralkyloxy group, a sulfonyloxy group, a di-substituted amino group or a substituted silyl group.

Specific examples of such halogen atoms include a chlorine atom, a bromine atom, an iodine atom and the like, and a chlorine atom is preferable.

As the alkyl group in X or Y of the above-mentioned general formula (1), an alkyl group hydrocarbon having 1 to 24 carbon atoms is preferable. Specific examples thereof include methyl group, ethyl group, n-propyl group, isopropyl group, n-butyl group, sec-butyl group, tert-butyl group, n-pentyl group, neo-pentyl group, iso-pentyl group, 1-methylbutyl group, n-hexyl group, n-octyl group, n-decyl group, n-dodecyl group, n-pentadecyl group, n-eicosyl group, and the like. Methyl group, ethyl group, isopropyl group, tert-butyl group, n-pentyl group, neo-pentyl group or iso-pentyl group is preferable.

Any one of these alkyl groups may be substituted with halogen atoms such as a fluorine atom, chlorine atom, bromine atom and iodine atom, alkoxy groups such as methoxy group, ethoxy group and the like, and aryloxy groups such as phenoxy group and the like.

Examples of the alkyl group having 1 to 24 carbon atoms which is substituted with a halogen atom include a fluoromethyl group, a difluoromethyl group, trifluoromethyl group, a chloromethyl group, a dichloromethyl group, trichloromethyl group, a bromomethyl group, a dibromomethyl group, tribromomethyl group, an iodomethyl group, a diiodomethyl group, triiodomethyl group, a fluoroethyl group, a difluoroethyl group, a trifluoroethyl group, a tetrafluoroethyl group, pentafluoroethyl group, a chloroethyl group, a dichloroethyl group, a trichloroethyl group, a tetrachloroethyl group, pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a perbromoeicosyl group and the like. When various isomers exist, such isomers are included.

Further, as the aryl group in X or Y in the general formula (1) described above, an aryl group having 6 to 24 carbon atoms is preferable, and specific examples thereof include phenyl group, 2-tolyl group, 3-tolyl group, 4-tolyl group, a 2,3-xylyl group, a 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6- trimethylphenyl group, 2,4,6-trimethylphenyl group, 3,4,5-trimethylphenyl group, 2,3,4,5-tetramethylphenyl group, pentamethylphenyl group, an ethylphenyl group, a n-propylphenyl group, a iso-propylphenyl group, a n-butylphenyl group, a sec-butylphenyl group, a tert-butylphenyl group, a n-pentylphenyl group, a neo-pentylphenyl group, a n-hexylphenyl group, naphtyl group, an antharcenyl group, and the like, and phenyl group is preferable. Any one of these aryl groups may be substituted with a halogen atom such as a fluorine atom, chlorine atom, bromine atom or an iodine atom, an alkoxy group such as methoxy group, ethoxy group or the like, and an aryloxy group such as phenoxy group or the like.

As the aralkyl group in X or Y in the general formula (1) described above, an aralkyl group having 7 to 24 carbon atoms is preferable, and specific examples thereof include benzyl group, (2-methylphenyl)methyl group, (3-methylphenyl) methyl group, (4-methylphenyl)methyl group, (2,3-dimethylphenyl)methyl group, (2,4-dimethylphenyl) methyl group, (2,5-dimethylphenyl)methyl group, (2,6-dimethylphenyl)methyl group, (3,4-dimethylphenyl)methyl group, (4,6-dimethylphenyl)methyl group, (2,4,6-trimethylphenyl)methyl group, (pentamethylphenyl)methyl group, a (ethylphenyl)methyl group, a (n-propylphenyl)methyl group, a (n-butylphenyl) methyl group, a (sec-butylphenyl)methyl group, a (tert-butylphenyl)methyl group, a (n-pentylphenyl) methyl group, a (neo-pentylphenyl)methyl group, naphtylmethyl group, antharcenylmethyl group and the like, and benzyl group is preferable. Any one of these aralkyl groups may be substituted with a halogen atom such as a fluorine atom, a chlorine atom, a bromine atom or an iodine, an alkoxy group such as methoxy group, ethoxy group or the like, and an aryloxy group such as phenoxy group or the like.

As the alkoxy group in X or Y in the general formula (1) described above, an alkoxy group having 1 to 24 carbon atoms is preferable, and specific examples thereof include methoxy group, ethoxy group, n-propoxy group, isopropoxy group, n-butoxy group, sec-butoxy group, tert-butoxy group, n-pentoxy group, neopentoxy group, n-hexoxy group, n-octoxy group, n-dodecoxy group, n-pentadecoxy group, n-icosoxy group, and the like, and methoxy group, ethoxy group or tert-butoxy group is preferable.

Any one of these alkoxy groups may be substituted with a halogen atom such as a fluorine atom, a chlorine atom, a bromine atom, or an iodine atom.

Further, as the aryloxy group in X or Y in the general formula (1) described above, an aryloxy group having 6 to 24 carbon atoms is preferable and specific examples thereof include phenoxy group, 2-methylphenoxy group, 3-methylphenoxy group, 4-methylphenoxy group, 2,3-dimethylphenoxy group, 2,4-dimethylphenoxy group, 2,5-dimethylphenoxy group, 2,6-dimethylphenoxy group, 3,4-dimethylphenoxy group, 3,5-dimethylphenoxy group, 2,3,4-trimethylphenoxy group, 2,3,5-trimethylphenoxy group, 2,3,5-trimethylphenoxy group, 2,3,6-trimethylphenoxy group, 2,4,5-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphtoxy group, an antharcenoxy group and the like. Phenoxy group is preferable. Any one of these aryloxy groups may be substituted with a halogen atom such as a fluorine atom, chlorine atom, bromine atom or iodine atom.

As the aralkyloxy group in X or Y in the above-mentioned formula (1) described above, an aralkyloxy group having 7 to 24 carbon atoms is preferable, and specific examples thereof include a benzyloxy group, (2-methylphenyl) methoxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl) methoxy group, (2,6-dimethylphenyl)methoxy group, (3,4-dimethylphenyl)methoxy group, (3,5-dimethylphenyl) methoxy group, (2,3,4-trimethylphenyl)methoxy group, (2,3,5-trimethylphenyl)methoxy group, (2,3,6-trimethylphenyl)methoxy group, (2,4,5-trimethylphenyl) methoxy group, (2,4,6-trimethylphenyl)methoxy group, (3,4,5-trimethylphenyl)methoxy group, (2,3,4,5-tetramethylphenyl)methoxy group, (2,3,5,6-tetramethylphenyl)methoxy group, (pentamethylphenyl) methoxy group, an (ethylphenyl)methoxy group, a (n-propylphenyl)methoxy group, an (isopropylphenyl) methoxy group, a (n-butylphenyl)methoxy group, a (sec-butylphenyl)methoxy group, a (tert-butylphenyl)methoxy group, a (n-hexylphenyl)methoxy group, a (n-octylphenyl) methoxy group, a (n-decylphenyl)methoxy group, a n-tetradecylphenyl)methoxy group, a naphtylmethoxy group, an antharcenylmethoxy group and the like, and a benzyloxy group is preferable. Any one of these aralkyloxyl groups may be substituted with halogen atoms such as a fluorine atom, a chlorine atom, a bromine atom or an iodine atom.

The sulfonyloxy group in X or Y in the general formula (1) described above represents a group indicated by the general formula $R^{10}SO_3$- and represents a sulfonyloxy group having 1 to 24 carbon atoms which may be optionally substituted. Specific examples thereof include those such as methanesulfonyloxy group, ethanesulfonyloxy group, dodecylsulfonyloxy group or the like whose $R^{10}$ is an alkyl group, those such as a trifluoromethanesulfonyloxy group or the like whose a part is substituted with a halogen atom, those such as p-toluenesulfonyloxy group or the like whose $R^{10}$ is an aryl group, or the like.

As the di-substituted amino group in X or Y in the general formula (1) described above, a di-substituted amino group having 2–24 carbon atoms which is substituted with two hydrocarbon groups is preferable. Specific examples the hydrocarbon groups include alkyl groups having 1 to 10 carbon atoms such as methyl group, ethyl group, n-propyl group, isopropyl group, n-butyl group, sec-butyl group, tert-butyl group, isobutyl group, n-pentyl group, n-hexyl group, cyclohexyl group and the like, aryl groups such as phenyl group and the like, etc. Examples of such di-substituted amino group having 2 to 24 carbon atoms include dimethylamino group, diethylamino group, di-n-propylamino group, di-isopropylamino group, di-n-butylamino group, di-sec-butylamino group, di-tert-butylamino group, di-n-octylamino group, di-n-decylamino group, di-phenylamino group, bis-trimethylsilylamino group, bis-tert-butyldimethylsilylamino group and the like, and dimethylamino group or diethylamino group is preferable.

As the substituted silyl group in X or Y in the general formula (1) described above, a substituted silyl group having 1 to 24 carbon atoms, in other words, a silyl group substituted with a hydrocarbon group is preferable. Examples of the hydrocarbon group include, for example, alkyl groups having 1 to 10 carbon atoms (e.g. methyl group, ethyl group, n-propyl group, isopropyl group, n-butyl group, sec-butyl group, tert-butyl group, isobutyl group, n-pentyl group, n-hexyl group, cyclohexyl group), aryl groups (e.g. phenyl group). Examples of such silyl group having 1 to 24 carbon atoms include a mono-substituted silyl group having 1 to 20 carbon atoms such as methylsilyl group, ethylsilyl group, phenylsilyl group or the like, a disubstituted silyl group having 2 to 20 carbon atoms such as dimethylsilyl group, diethylsilyl group, diphenylsilyl group or the like, a trisubstituted silyl group having 3 to 20 carbon atoms such as trimethylsilyl group, triethylsilyl group, tri-n-propylsilyl group, tri-isopropylsilyl group, tri-n-butylsilyl group, tri-sec-butylsilyl group, tri-tert-butylsilyl group, tri-isobutylsilyl group, tert-butyldimethylsilyl group, tri-n-pentylsilyl group, tri-n-hexylsilyl group, tricyclohexylsilyl group, triphenylsilyl group and the like, and trimethylsilyl group, tert-butyldimethylsilyl group or triphenylsilyl group is preferable.

Any hydrocarbon group of these substituted silyl groups may be substituted with a halogen atom such as a fluorine atom, chlorine atom, bromine atom or iodine atom.

These X and Y may optionally be bonded to form a ring. Each of a halogen atom, an alkyl group or an aralkyl group is independently preferable as X and Y in the fore-mentioned general formula (1), and chlorine atom, methyl group or benzyl group is more preferable.

Respective $R^1$, $R^2$, $R^3$, $R^4$, $R^5$, $R^6$, $R^7$ and $R^8$ in the fore-mentioned general formula (1) independently represent a hydrogen atom, an alkyl group, an aryl group, an aralkyl group, an alkoxy group, an aryloxy group, an aralkyloxy group, a di-substituted amino group or a substituted silyl group. Further, $R^1$, $R^2$, $R^3$, $R^4$, $R^5$, $R^6$, $R^7$ and $R^8$ may optionally be bonded to form a ring. Each of an alkyl group, an aryl group, an aralkyl group, an alkoxy group, an aryloxy group, an aralkyloxy group, a di-substituted amino group or a substituted silyl group in $R^1$, $R^2$, $R^3$, $R^4$, $R^5$, $R^6$, $R^7$ or $R^8$ is similar as in X or Y.

An aryl group or a substituted silyl group is preferable as $R^1$, $R^2$, $R^3$, $R^4$, $R^5$, $R^6$, $R^7$ or $R^8$ in the present invention.

In the fore-mentioned general formula (1), T represents a divalent covalent cross-linking group having 1 to 20 carbon atoms, or a divalent group represented by —O—, —S—, —S—S—, —S(=O)—, —S(=O)$_2$—, —C(=O)—, —N($R^9$)—, —P($R^9$)—, or —P(=O)($R^9$)— (wherein $R^9$ represents a hydrogen atom or a hydrocarbon group having 1 to 6 carbon atoms in each case) and n is an integer selected from 0 to 3.)

As the divalent common cross-linking group having 1 to 20 carbon atoms, methylene group, ethylene group, trimethylene group, propylene group, diphenylethylene group, ethylidene group, propylidene group, isopropylidene group, n-butylidene group, isobutylidene group and the like are exemplified. Among them, methylene group, ethylene group, ethylidene group, isopropylidene group, or isobutylidene group is preferably used.

Further, in the divalent group represented by —N($R^9$)—, —P($R^9$)—, or —P(=O) ($R^9$)— as T, $R^9$ represents a hydrogen atom or a hydrocarbon group having 1 to 24 carbon atoms in each case. As the hydrocarbon group, an alkyl group having 1 to 24 carbon atoms, an aryl group having 6 to 24 carbon atoms or an aralkyl group having 7 to 24 carbon atoms is preferable. An alkyl group having 1 to 24 carbon atoms is more preferable.

A divalent group represented by —O— or —S— is preferable as T, and —S— is more preferable.

n is an integer of 0 to 3, and represents the number of the unit T. Among these, 0 or 1 gives a preferable result in particular, and n is more preferably 1.

The transition metal compound in the fore-mentioned general formula (1) can be easily produced and isolated. For example, the production process (I) and (II) described below are illustrated.

(I) A process for producing the transition compound by reacting a compound represented by the general formula (2) described below with a transition metal compound represented by the general formula (3) described below.

(II) A process for producing the transition compound by reacting a compound of the general formula (2) described below with an organoalkaline metal compound, an alkaline metal hydride compound or an organomagnesium compound (hereinafter, sometimes referred to as "the metal compound") to obtain a halide compound and then reacting it with the transition metal compound represented by the general formula (3) described below.

The halide compound may not be separated in the process (II). Further, it is also possible in the process (II) to mix together the compound represented by the general formula (2), the metal compound and the transition metal compound represented by the general formula (3) and react them.

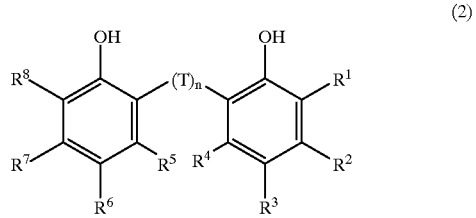

(2)

(Wherein respective $R^1$, $R^2$, $R^3$, $R^4$, $R^5$, $R^6$, $R^7$ and $R^8$ independently represent a hydrogen atom, an alkyl group, an aryl group, an aralkyl group, an alkoxy group, an aryloxy group, an aralkyloxy group, a di-substituted amino group or a substituted silyl group. Further, $R^1$, $R^2$, $R^3$, $R^4$, $R^5$, $R^6$, $R^7$ and $R^8$ may arbitrarily bond to form a ring. T represents a divalent covalent cross-linking group having 1 to 20 carbon atoms, or a divalent group represented by —O—, —S—, —S—S—, —S(=O)—, —S(=O)$_2$—, —C(=O)—, —N($R^9$)—, —P($R^9$)—, or —P(=O)($R^9$)— (wherein $R^9$ represents a hydrogen atom or a hydrocarbon group having 1 to 6 carbon atoms in each case). n is an integer of 0 to 3.)

$$MZ^1Z^2Z^3Z^4 \qquad (3)$$

(wherein M represents a transition metal atom of the Fourth Group of the Periodic Table, and respective $Z^1$, $Z^2$, $Z^3$ and $Z^4$ independently represent a halogen atom, an alkoxy group, an aryloxy group, an aralkyloxy group, a di-substituted amino group, an alkyl group, an aryl group or an aralkyl group.)

Respective $R^1$, $R^2$, $R^3$, $R^4$, $R^5$, $R^6$, $R^7$, $R^8$ and T in the general formula (2) are the same as in the general formula (1).

As specific examples of the compound represented by the general formula (2), 2-(2-hydroxypropyl)phenol, cathecol, resorcinol, 4-isopropylcathecol, 3-methoxycathecol, 1,8-dinydroxynaphthalene, 1,2-dinydroxynaphthalene, 2,2'-biphenyldiol, 1,1'-bi-2-naphthol, 2,2'-dihydroxy-6,6'-dimethylbiphenyl, 4,4',6,6'-tetra-tert-butyl-2,2'-methylenediphenol, 4,4',6,6'-tetramethyl-2,2'-isobutylidenediphenol, 2,2'-thiobis[4-methyl-6-(1-methylethyl)phenol], 2,2'-thiobis (4,6-dimethylphenol), 2,2'-thiobis(4-methyl-6-tert-butyl)phenol and the like can be exemplified. Among these, 2,4-dihydroxypentane, cathecol, 2,2'-biphenyldiol, 1,1'-bi-2-naphthol, 4,4',6,6'-tetra-tert-butyl-2,2'-methylenediphenol, 4,4'-dimethyl-6,6'-di-tert-butyl-2,2'-methylenediphenol, 4,4',6,6'-tetramethyl-2,2'-isobutylidenediphenol, 2,2'-thiobis[4-methyl-6-(1-methylethyl)phenol] and 2,2'-thiobis(4,6-dimethylphenol) 2,2'-thiobis(4-methyl-6-tert-butyl)phenol give a preferable result.

In the transition metal compound represented by the above-mentioned general formula (3), $Z^1$, $Z^2$, $Z^3$ and $Z^4$ independently represent a halogen atom, an alkoxy group, an aryloxy group, an aralkyloxy group, a sulfonyloxy group, a di-substituted amino group, an alkyl group, an aryl group or an aralkyl group. Further, these may be optionally bonded in part to form a ring.

$Z^1$, $Z^2$, $Z^3$ and $Z^4$ are the same as in X or Y in the above-mentioned general formula (1). More specific examples of the transition metal compound represented by the general formula (3) include titanium halides such as titanium tetrachloride, titanium tetrabromide, titanium tetraiodide and the like, titanium amides such as tetrakis (dimethylamino) titanium, dichlorobis(dimethylamino) titanium, trichloro(dimethylamino) titanium, tetrakis (diethylamino) titanium and the like, alkoxytitaniums such as tetraisopropoxytitanium, tetra n-butoxytitanium, diisopropoxytitanium dichloride, isopropoxytitanium trichloride and the like, and compounds in which titanium in the above-mentioned compounds is replaced with zirconium or hafnium, etc.

In the production process (I) or (II), the amount used of the transition metal compound represented by the general formula (3) is usually 0.5 to 3-fold mol, and preferably 0.7 to 1.5-fold mol based on the compound represented by the general formula (2).

Specific examples of the organoalkaline metal compound used in the production process (II) include organolithium compounds such as methyllithium, ethyllithium, n-butyllithium, sec-butyllithium, tert-butyllithium, lithium trimethylenesilyl acetylide, lithium acetylide, trimethylsilyl methyllithium, vinyllithium, phenyllithium, allyllithium and the like, organoalkaline metal compounds in which lithium in these compounds is replaced with sodium, potassium, rubidium or cesium. Preferably, an alkaline metal compound having an alkyl group with 1 to 10 carbon atoms is preferred, a compound having an alkyl group with 1 to 10 carbon atoms of lithium, sodium or potassium is more preferred, and an alkyllithium compound having an alkyl group with 1 to 10 carbon is most preferred.

The alkaline metal hydride is a hydride of lithium, sodium, potassium, rubidium or cesium, and sodium hydride or potassium hydride is preferred.

Examples of the organomagnesium compound include dialkylmagnesium compounds and alkylmagnesium halides, and specifically, dimethylmagnesium, diethylmagnesium, di-n-butylmagnesium, diisopropylmagnesium, n-butylethylmagnesium, methylmagnesium iodide, methylmagnesium chloride, isopropylmagnesium halide and the like. Alkylmagnesium halides having an alkyl group of 1 to 10 carbon atoms are preferred.

As the above-mentioned metal compounds, organoalkaline metal compounds or alkaline metal hydrides are preferable and the alkyllithium is more preferable. The amount used of the metal compound in the production process (II) is usually 1~5-fold mol based on the compound represented by the general formula (2).

The reaction is generally carried out in the presence of a solvent. Examples of the solvent used include an aprotic solvent of an aromatic hydrocarbon such as benzene, toluene, xylene, mesitylene or the like, an aliphatic hydrocarbon such as pentane, hexane, heptane, octane or the like, an ether type solvent such as diethyl ether, tetrahydrofuran, 1,4-dioxane or the like, an amide type solvent such as hexamethylphosphoric amide, dimethyl amide, a polar solvent such as acetonitrile, propionitrile, acetone, diethyl ketone, methylisobutyl ketone, cyclohexanone or the like, a halogenated solvent such as dichloromethane, dichloroethane, chlorobenzene, dichlorobenzene, or the like, etc. Such solvent is used alone or two or more in combination, and the amount used thereof is usually 1 to 200 ml/g based on the volume to weight of the compound represented by the general formula (2) and Preferably 3 to 50 ml/g.

The reaction (I) can be carried out in the presence of a tertiaryamine compound or the like, and triethylamine and diisopropylethylamine, N,N,N',N'-tetramethylethylenediamine and the like are preferably used as the tertiaryamine compound as an additive aid. The amount used is usually 1 to 10-fold mol based a compound represented by the general formula (2), preferably 1.5 to 5-fold mol and more preferably 1.8 to 4-fold mol.

The reaction of the production process (I) is carried out in a range of −100° C. to 200° C., and preferably −80° C. to 150° C. A range of −50° C. to 120° C. is more preferable. The reaction temperature in the production process (II) is usually from −100° C. to the boiling point of the solvent used as a medium, but when the organoalkaline metal is used, a range of −80° C. to 40° C. is preferable and when the organomagnesium compound is used, a range of 10° C. to 100° C. is preferable, respectively.

When there is a solid component which is produced as a by-product by the reaction from the reaction mixture containing the transition metal compound represented by the general formula (I) according to the above-mentioned reaction, it is separated by filtration or the like in the presence of a predetermined solvent, and further, after heating and concentrating the solvent or by standing alone in another solvent alone or a mixed solvent at a cooled dark place, crystals of the complex can be separated. Further, it is possible to efficiently precipitate the desired complex in high purity to take out, while industrially stirring without standing alone, for example, cooling gradually.

The compound represented by the general formula (2) in the present invention is produced by various processes. For example, when T is a sulfur atom, the compound can be easily synthesized by reacting various kind of phenol compounds with sulfur dichloride in a solvent while stirring.

The solvent used includes an aprotic solvent of an aliphatic hydrocarbon such as pentane, hexane, heptane, octane or the like, an etheral solvent such as diethyl ether, tetrahydrofuran, 1,4-dioxane or the like, a halogenated hydrocarbon solvent such as dichloromethane, dichloroethane, chlorobenzene, dichlorobenzene or the like, etc.

The component (B) in the above-mentioned olefin polymerization catalyst is an organoaluminumoxy compound soluble in an aromatic hydrocarbon solvent. The examples thereof include methylaluminoxane, ethylaluminoxane, propylaluminoxane, butylaluminoxane, isobutylaluminoxane, methylethylaluminoxane, methylbutylaluminoxane, methylisobutylaluminoxane, the organoaluminumoxy compound represented by the general formula (4) or (5) described below, and the like. Among them, methylisobutylaluminoxane, and the organoaluminumoxy compounds represented by the general formula (4) and (5) described below are preferred.

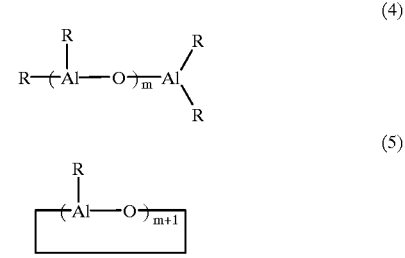

(wherein R represents methyl group or isobutyl group, the presence ratio of a methyl group and an isobutyl group is methyl group: isobutyl group=5 to 95:95 to 5. m represents a number in a range of 1 to 50.)

The organoaluminumoxy compound soluble in an aromatic hydrocarbon solvent which is used in the present invention can form a component insoluble in the aromatic hydrocarbon solvent by reacting with water.

The amount of the organoaluminumoxy compound used can be usually selected in a wide range of 1 to 20,000 mol in terms of an aluminum atom contained in the organoaluminumoxy compound per one mol of a transition metal atom contained in the transition metal compound (A). The preferable range is from 100 to 10,000 mol per one mol of the transition metal atom.

Water is used as the component (C) in the above-mentioned olefin polymerization catalyst. The amount of the water (C) used can be usually selected in a wide range of 0.1 to 3.0 mol per one mol of an aluminum atom contained in the organoaluminumoxy compound (B). The preferable range is from 0.1 to 1.0 per one mol of the aluminum atom.

As a method of feeding the respective catalyst components in a polymerization reactor, a transition metal compound (A), an aromatic organoaluminumoxy compound (B) and water (C) may be separately fed or may be fed after contacting them in advance.

Specific examples of a method of previously contacting include a method of contacting an organoaluminumoxy compound (B) with water (C) and then removing the solvent followed by contacting with the component (A), a method of contacting the component (B) with the component (C) and then contacting with the component (A), a method of contacting the component (A), the component (B) and the component (C) at the same time, and the like. Examples of a contacting method of the component (C) include a method of directly contacting water, a method of previously mixing water with a solvent and contacting the mixture with other components, a method of contacting a metal salt containing a crystal water or an inorganic or organic material containing absorbed water with other components, a method of contacting a gas such as nitrogen containing moisture, or the like with other components, etc. when the component (B) is contacted with the component (C), a component insoluble in an aromatic hydrocarbon solvent sometimes form.

Polymerization is usually carried out over a wide range of −30 to 300° C., preferably 0 to 280° C. and more preferably 20 to 250° C.

The polymerization pressure is not particularly restricted, and is preferably from about normal pressure to about 150 atom from industrial and economic viewpoints. The polymerization time is suitably determined according to a kind of the desired polymer and a reaction apparatus in general, and adopts a range of 30 seconds to 40 hours.

As a polymerization process, either of batch type and continuous type are applicable. Further, a slurry or solution polymerization with an inert hydrocarbon solvent such as propane, pentane, hexane, heptane, octane or the like, a bulk polymerization using a monomer as a solvent or a gas phase polymerization is applicable.

A chain transfer agent such as hydrogen or the like can be added in order to control the molecular weight of the olefin polymer.

According to the production process of the olefin polymer, when the olefin polymer is a homopolymer of 1-butene, it is possible to preferably obtain an olefin polymer having a molecular weight distribution represented by a ratio of a polystyrene-reduced weight average molecular weight (Mw) to a polystyrene-reduced number average molecular weight (Mn) of 2.5 or less.

EXAMPLE

The present invention is specifically illustrated according to Examples below, but the scope of the present invention is not restricted by Examples.

The value of respective items in Examples was measured by methods described below.

(1) Intrinsic viscosity ([η]: dl/g) It was measured in tetralin at 135° C. with an Ubbelohde viscometer.

(2) Polystyrene-reduced weight average molecular weight (Mw), polystyrene-reduced number average molecular weight (Mn) and Molecular weight distribution (Mw/Mn)

They were measured with a gel permeation chromatograph (GPC) under conditions described below. A calibration curve was prepared using a standard polystyrene.

| Measuring instrument | 150 Cv type manufactured by Millipore Waters Company Ltd. |
|---|---|
| Column | Shodex M/S 80 |
| Measurement temperature | 145° C., |
| Solvent | Ortho-dichlorobenzene |
| Sample concentration | 5 mg/8 ml |

(3) Measurement with a differential scanning calorimeter (DSC)

It was measured under the conditions below using DSC-VII manufactured by Perkin-Elmer Company, Ltd.
Raising temperature: 20° C. to 200° C. (20° C./min.), retention for 10 min.
Cooling: 200° C. to −100° C. (20° C./min.), retention for 10 min.
Measurement: −100° C. to 300° C. (raising temperature at 20° C./min.)

Reference Example 1

Synthesis of dichloro{2,2'-thiobis[4-methyl-6-(tert-butyl)phenolato]} titanium

The title compound was synthesized according to a literature (Arjan van der Linden et. al., Journal of the American Chemical Society, 117, 3008(1995))

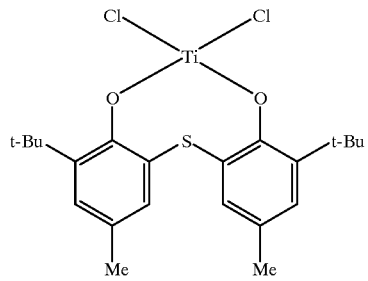

Example 1

A 100 ml stainless autoclave was replaced with argon, and 20 mmol of (poly)methylisobutylaluminoxane (hereinafter, occasionally abbreviated to as MMAO) manufactured by Tosoh-Akzo Co., Ltd. of toluene solution and 11 mmol of water were added therein and the mixture was mixed by stirring for 10 minutes.

On the other hand, in an egg-plant type flask with an inner volume of 25 ml replaced with argon, 5 ml of purified toluene and 1.2 mg of dichloro{2,2'-thiobis[4-methyl-6-(tert-butyl)phenolato} titanium were mixed while stirring, and then charged into the autoclave. The molar ratio of [Al]/[Ti] of the catalyst solution prepared then was 8,000. After the catalyst solution was mixed by stirring at room temperature for 10 minutes, 30 g of 1-butene was charged and the polymerization was carried out at 40° C. for 30 minutes. After completion of the reaction, an unreacted 1-butene was purged, the content of the autoclave was charged in about 10-fold acidic methanol, and the precipitated polymer was filtered to be dried at 80° C. for about 2 hours. As a result, 0.9 g of poly(1-butene) was obtained. Mw of the poly(1-butene) obtained was 348×10$^4$, Mn was 175×10$^4$, Mw/Mn was 2.0, and no crystal fusion peak by DSC was detected. The glass transition temperature (Tg) was observed at −20° C. and the polymer was amorphous.

Example 2

A 100 ml stainless autoclave was replaced with argon, 20 mmol of MMAO and 11 mmol of water were added therein and the mixture was mixed by stirring for 10 minutes.

On the other hand, in an egg-plant type flask with an inner volume of 25 ml replaced with argon, 5 ml of purified toluene and 1.2 mg of dichloro{2,2'-thiobis[4-methyl-6-(tert-butyl)phenolato} titanium were mixed by stirring, and then charged into the autoclave. The molar ratio of [Al]/[Ti] of the catalyst solution prepared then was 8,000. After the catalyst solution was mixed by stirring at room temperature for 10 minutes, 31.5 ml of 1-hexene and 14 g of 1-butene were charged and the polymerization was carried out at 40° C. for 1 hour. Then, the polymerization was terminated by adding methanol. Further, the mixture was charged into about 10-fold acidic methanol, and the precipitated polymer was filtered to be dried at 80° C. for about 2 hours. As a result, 1.1 g of poly(1-butene/1-hexene) copolymer was obtained. Mw of the polymer obtained was 582×10$^4$, Mn was 227×10$^4$, Mw/Mn was 2.6, and no crystal fusion peak by DSC was detected. The glass transition temperature (Tg) was observed at −36° C. and the polymer was amorphous.

Example 3

A 100 ml stainless autoclave was replaced with argon, 20 mmol of MMAO and 11 mmol of water were added therein and the mixture was mixed by stirring for 10 minutes.

On the other hand, in an egg-plant type flask with an inner volume of 25 ml replaced with argon, 5 ml of purified toluene and 1.2 mg of dichloro{2,2'-thiobis[4-methyl-6-(tert-butyl)phenolato} titanium were mixed by stirring, and then charged into the autoclave. The molar ratio of [Al]/[Ti] of the catalyst solution prepared then was 8,000. After the catalyst solution was mixed by stirring at room temperature for 10 minutes, 15.6 ml of 1-octene and 22.4 g of 1-butene were charged and the polymerization was carried out at 40° C. for 1 hour. Then, the polymerization was terminated by adding methanol. Further, the mixture was charged into about 10-fold acidic methanol, and the precipitated polymer was filtered to be dried at 80° C. for about 2 hours. As a result, 1.0 g of poly(1-butene/1-octene) copolymer was obtained. Mw of the polymer obtained was 537×10$^4$, Mn was 86×10$^4$, Mw/Mn was 6.2, and no crystal fusion peak by DSC was detected. The glass transition temperature (Tg) was observed at −50° C. and the polymer was amorphous.

Example 4

A 100 ml stainless autoclave was replaced with argon, 20 mmol of MMAO and 11 mmol of water were added therein and the mixture was mixed by stirring for 10 minutes.

On the other hand, in an egg-plant type flask with an inner volume of 25 ml replaced with argon, 5 ml of purified toluene and 1.2 mg of dichloro{2,2'-thiobis[4-methyl-6-(tert-butyl)phenolato} titanium were mixed by stirring, and then charged into the autoclave. The molar ratio of [Al]/[Ti] of the catalyst solution prepared then was 8,000. After the catalyst solution was mixed by stirring at room temperature for 10 minutes, 25.5 ml of 4-methyl-1-pentene and 16.8 g of 1-butene were charged and the polymerization was carried out at 40° C. for 1 hour. Then, the polymerization was terminated by adding methanol. Further, the mixture was charged into about 10-fold acidic methanol, and the precipitated polymer was filtered to be dried at 80° C. for about 2 hours. As a result, 0.8 g of poly(1-butene/4-methyl-1-pentene) copolymer was obtained. Mw of the polymer obtained was 793×10$^4$, Mn was 342×10$^4$, Mw/Mn was 2.3, and no crystal fusion peak by DSC was detected. The glass transition temperature (Tg) was observed at 17° C. and the polymer was amorphous.

Comparative Example 1

A 100 ml stainless autoclave was replaced with argon, 10 ml of purified toluene, 9.6 mg of dichloro{2,2'-thiobis[4-methyl-6-(tert-butyl)phenolato} titanium and 10 mmol of MMAO were added and mixed.

The molar ratio of [Al]/[Ti] of the catalyst solution prepared then was 500. After the catalyst solution was mixed by stirring at room temperature for 10 minutes, 7.0 g of 1-butene was charged and the polymerization was carried out at room temperature for 1 hour. After completion of the reaction, 1-butene unreacted was purged, the content of the autoclave was charged in about 10-fold acidic methanol, and the precipitated polymer was filtered to be dried at 80° C. for about 2 hours. As a result, 0.6 g of poly(1-butene) was obtained. Mw of the poly(1-butene) obtained was 1.4×10$^4$, Mn was 0.7×10$^4$, Mw/Mn was 2.0.

Comparative Example 2

The reaction was carried out in the same manner as in Example 1 except that 0.95 mg of biscyclopentadienyl-hafnium dichloride was used in place of dichloro{2,2'-thiobis [4-methyl-6-(tert-butyl)phenolato} titanium. As a result, 2.1 g of poly(1-butene) was obtained. [η] of the poly(1-butene) obtained was 0.28, Mw was 6.4×10$^4$, Mn was 2.9×10$^4$, Mw/Mn was 2.2.

As described above, according to the present invention, an amorphous polymer having a high molecular weight enough to improve problems such as stickiness and elution to an organic solvent and to exhibit an elastomeric property, and substantially not having a melting point, and a process for producing the amorphous polymer, are provided.

What is claimed is:

1. An olefin polymerization catalyst obtained by contacting:

a transition metal compound (A) represented by the general formula (1) described below;

an organoaluminumoxy compound (B) soluble in an aromatic solvent; and water (C), wherein the molar ratio of aluminum atom contained in the organoaluminumoxy compound (B) to a transition metal atom contained in the transition metal compound (A) is 1 to 20000, and the amount of water used is 0.1 to 3.0 mol per 1 mol of aluminum atom contained in the organoaluminumoxy compound (B),

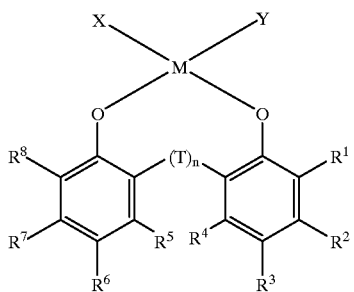

wherein M represents a transition metal atom of the Fourth Group of the Periodic Table, X and Y independently represent a hydrogen atom, a halogen atom, an alkyl group, an aryl group, an aralkyl group, an alkoxy group, an aryloxy group, an aralkyloxy group, a sulfonyloxy group, a di-substituted amino group or a substituted silyl group, $R^1$, $R^2$, $R^3$, $R^4$, $R^5$, $R^6$, $R^7$ and $R^8$ independently represent a hydrogen atom, an alkyl group, an aryl group, an aralkyl group, an alkoxy group, an aryloxy group, an aralkyloxy group, a di-substituted amino group or a substituted silyl group, $R^1$, $R^2$, $R^3$, $R^4$, $R^5$, $R^6$, $R^7$ and $R^8$ may be optionally bonded to form a ring, T represents a divalent covalent crosslinking group having 1 to 20 carbon atoms, or a divalent group represented by —O—, —S—, —S—S—, —S(=O)—, —S(=O)$_2$—, —C(=O)—, —N($R^9$)—, —P($R^9$)— or —P(=O) ($R^9$)—wherein $R^9$ represents a hydrogen atom or a hydrocarbon group having 1 to 6 carbon atoms in each case, and n is an integer of from 0 to 3.

2. The olefin polymerization catalyst according to claim 1, wherein T is a divalent group represented by —S—.

3. The olefin polymerization catalyst according to claim 1, wherein the organoaluminumoxy compound (B) soluble in an aromatic solvent is methylisobutylalumoxane.

4. The olefin polymerization catalyst according to claim 1, wherein the organoaluminumoxy compound (B) soluble in an aromatic hydrocarbon solvent is an organoaluminumoxy compound represented by the general formula (4) or (5):

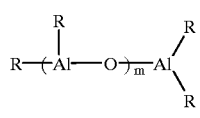

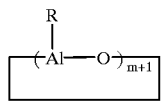

wherein R represents methyl group or isobutyl group, the presence ratio of methyl group and isobutyl group is methyl group: isobutyl group=5 to 95:95 to 5, Al represents an aluminum atom, and m represents a number of 1 to 50.

5. The olefin polymerization catalyst according to claim 1, wherein the amount of the organoaluminumoxy (B) is 100 to 10,000 mol in terms of an aluminum atom contained in the organoaluminumoxy compound per one mol of a transition metal atom contained in the transition metal compound (A), and the amount of the water (C) is 0.1 to 1.0 mol per one mol of an aluminum atom contained in the organoaluminumoxy compound (B).

6. A process for producing an olefin polymer selected from the group consisting of a 1-butene homopolymer, a copolymer of 1-butene with propylene, and a copolymer of 1-butene with an alkenyl hydrocarbon having 5 or more carbon atoms having a polystyrene-reduced number average molecular weight of 200,000 or more and being an amorphous polymer substantially not having a melting point, which comprises homo-polymerizing 1-butene or copolymerizing 1-butene with propylene or the alkenyl hydrocarbon having 5 or more carbon atoms with the olefin polymerization catalyst defined in claim 1.

7. The process according to claim 6, wherein T in the olefin polymerization catalyst is a divalent group represented by —S—.

8. The process according to claim 6, wherein the organoaluminumoxy compound (B) soluble in an aromatic solvent in the olefin polymerization catalyst is methylisobutylalumoxane.

9. The process according to claim 6, wherein the organoaluminumoxy compound (B) soluble in an aromatic hydrocarbon solvent in the olefin polymerization catalyst is an organoaluminumoxy compound represented by the general formula (4) or (5):

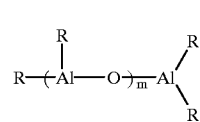

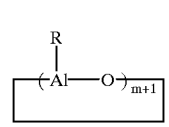

wherein R represents methyl group or isobutyl group, the presence ratio of methyl group and isobutyl group is methyl group: isobutyl group=5 to 95:95 to 5, Al represents an aluminum atom, and m represents a number of 1 to 50.

10. The process according to claim 6, wherein the amount of the organoaluminumoxy (B) is 1 to 20,000 mol in terms of an aluminum atom contained in the organoaluminumoxy compound per one mol of a transition metal atom contained in the transition metal compound (A), and the amount of the water (C) is 0.1 to 3.0 mol per one mol of an aluminum atom contained in the organoaluminumoxy compound (B).

* * * * *